July 7, 1959  J. GASSMANN  2,894,051
CHAIN DRIVE
Filed June 13, 1955
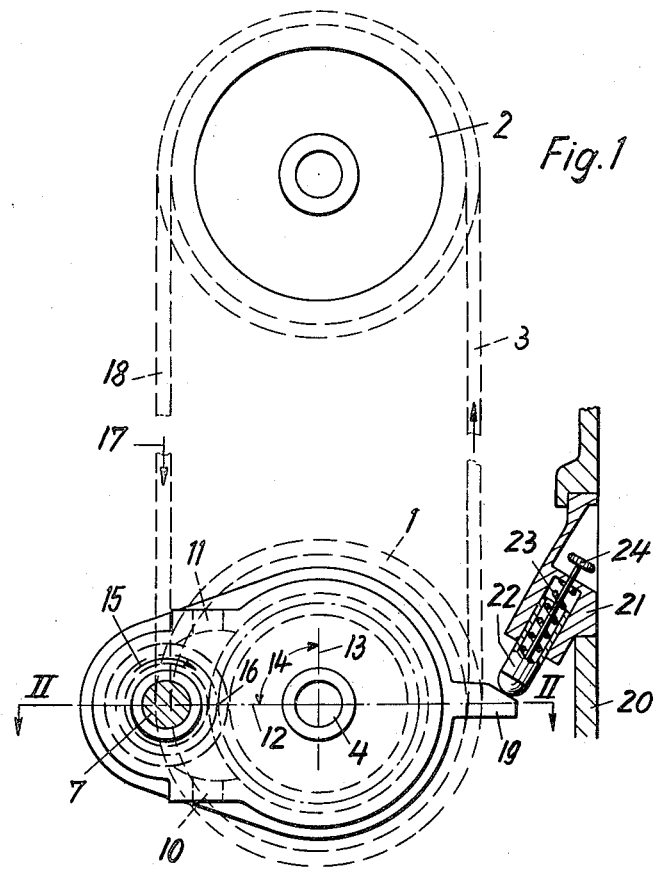
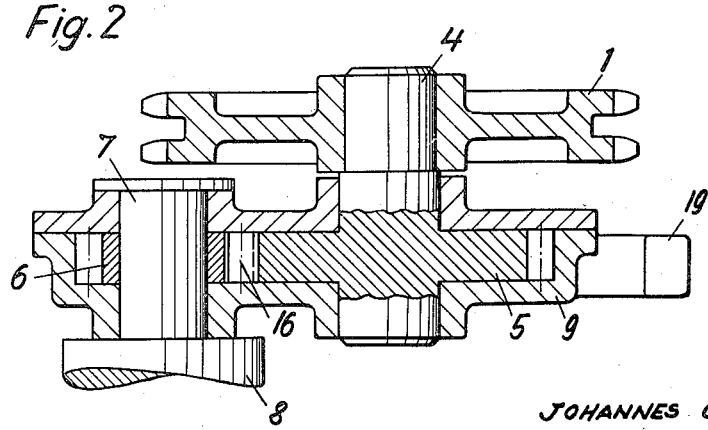
INVENTOR
JOHANNES GASSMANN
BY Dicke and Craig
ATTORNEYS United States Patent Office 2,894,051
Patented July 7, 1959

2,894,051

CHAIN DRIVE

Johannes Gassmann, Altbach, near Esslingen, Germany, assignor to Daimler-Benz Aktiengesellschaft, Stuttgart-Unterturkheim, Germany Application June 13, 1955, Serial No. 515,174

Claims priority, application Germany June 14, 1954

6 Claims. (Cl. 123—146.5)

The present invention relates to new and useful improvements in chain drives for operating a time control shaft of internal combustion engines.

It is the principal object of the present invention to provide a chain tightener for compensating the drag of a chain which drives the shaft of an ignition timer so that the timing after having been once properly set will not vary.

A feature of the invention for attaining such object essentially consists in mounting the driving sprocket of the chain drive on a rocker arm which is pivotable about the drive shaft of the engine, for example, the crankshaft, so as to be parallel to such drive shaft, and in driving such sprocket wheel preferably through a set of gears, the mounting arrangement preferably being such that the axes of the driving and driven sprockets and the two planes containing the axes of the driving sprocket and the drive shaft enclose a substantially right angle. Such a design and arrangement of the chain drive reduces the timing errors which usually occur when the chain is stretched, to about one-half of the value which is regarded as unavoidable in the chain drives for ignition timers known prior to this invention in which the driving sprocket is mounted, for example, directly on the crankshaft.

A further important advantage of the new chain drive is obtained if the driving direction of the set of gears at their point of engagement coincides with the direction of movement of the pulling chain strand, since the driving torque which the inventive arrangement produces at the rocker arm will then also have a tendency to tighten the chain so that a special resilient chain tensioning device may either be omitted entirely or be made very small and of a very simple construction.

In four-cycle engines the present invention produces the further advantages that by providing a set of gears for obtaining the necessary reduction in speed between the crank shaft and the timer shaft, the chain drive may consist of two equal sprockets of relatively small size, and further that space will be saved, especially at the point on the crankshaft where previously the larger sprocket had to be mounted.

Additional features of the invention which are of considerable advantage consist in the fact that the rocker arm may be designed so as to form a housing enclosing the set of gears, and that the same rocker arm in combination with the set of gears may form a gear pump. The particular advantage obtained by such arrangement consists in the fact that no additional gears will be required to produce the set of gears necessary for driving the sprocket of the timer chain drive, and that such set of gears may consist of the gears of a customary oil pump which is usually required for the operation of any internal combusion engine, for example, for the oil circulating system.

Further objects, features, and advantages of the present invention will be apparent from the following detailed description, particularly when read with reference to the accompanying drawings, in which:

Fig. 1 shows a side view of the chain drive according to the invention; while

Fig. 2 shows a cross section through the rocker arm of the chain drive which has been taken along line II—II of Fig. 1.

Referring to the drawings, the chain drive according to the invention consists of two sprocket wheels 1 and 2 of equal size which are connected with each other by a driving chain 3. The driving sprocket 1 is rigidly secured to a stud 4 which carries at one side of sprocket 1 and preferably integral therewith, a gear 5 of a set of gears which is in mesh with another gear 6 which is rigidly secured to one end 7 of the crankshaft 8 of a four-cycle engine.

As illustrated in Figs. 1 and 2, gear 5 is twice as large as gear 6 so that the speed of the crankshaft 8 will be transmitted to the stud 4 at a reduction of 2:1. As shown particularly in Fig. 2, gear 5 is mounted within a rocker arm 9 which is pivotably mounted about the end 7 of the crankshaft 8, and at the same time, rocker arm 9 forms a housing enclosing the gears 5 and 6. In combination with gears 5 and 6, the rocker arm or housing 9 forms a gear pump, as illustrated particularly in Fig. 1, in which numerals 10 and 11 indicate the inlet and outlet openings of such pump for connecting the oil lines thereto.

As further illustrated in Fig. 1, the planes 12 and 13 connecting the axis of the driving sprocket 1 with the axis of the drive or crankshaft of the engine and the axis of the driven sprocket, respectively, enclose a substantially right angle 14. Furthermore, the driving direction of the gears 5 and 6, as shown by the arrow 15 in Fig. 1 coincides with the direction of movement of the pulling strand 18 of chain 3, as shown by the arrow 17.

Near its outer end, rocker 9 has a projection 19 which is acted upon by a device 21 which is mounted on the crankcase 20 of the engine and produces an additional tensioning action upon the chain 3, and also prevents an accidental rotation of the rocker in the direction in which the chain would become slack. A locking member 22 of this device 21 which ordinarily engages with the projection 19 of the rocker 9 may be retracted therefrom against the force of a coil spring 23 which also provides the initial tensioning of the chain 3. For this purpose, the member 22 is provided with a simple head or button 24 for drawing the same out of the pivoting range of rocker 9, whereupon rocker 9 may be pivoted in the direction toward the driven sprocket 2, for example, for applying or removing chain 3.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. In combination with an internal combustion engine having a drive shaft, an ignition timer, and a chain drive connecting said drive shaft with the control shaft of said timer, said chain drive comprising a rocker pivotably mounted on said drive shaft, a driving sprocket rotatably mounted on said rocker, a set of gears connecting said drive shaft with said driving sprocket, a driven sprocket mounted on said timer shaft, and a chain connecting said sprockets, the two planes containing the axes of both of said sprockets and the axes of said driving sprocket and said drive shaft, respectively, enclosing a substantially right angle.

2. In combination as defined in claim 1, wherein the driving direction of said set of gears at their point of engagement substantially coincides with the direction of movement of the pulling strand of said chain, the substantial coincidence of said directions promoting the automatic tightening of the chain.

3. In a combination as defined in claim 1, wherein said internal combustion engine is a four-cycle engine, and wherein said set of gears are of a size so as to produce the required speed reduction between said drive shaft to said timer shaft.

4. In a combination as defined in claim 1, wherein said rocker also forms a housing enclosing said set of gears and with said gears forms a gear pump.

5. In a combination as defined in claim 1, further comprising additional means for tensioning said chain, said means being mounted on the housing of said engine and adapted to act upon the free outer end of said rocker and preventing said rocker from accidentally turning in a direction in which said chain will be loosened.

6. In a combination as defined in claim 5, wherein said tensioning means comprise a locking bolt adapted to engage with the free end of said rocker, a spring tending to press said bolt in a direction opposed to the direction of movement of said chain so as to provide said chain with an initial tension, and means for retracting said bolt from engagement with said rocker.

References Cited in the file of this patent

UNITED STATES PATENTS

| | | |
|---|---|---|
| 628,169 | Starley | July 4, 1899 |
| 1,166,979 | Gallet | Jan. 4, 1916 |
| 1,585,731 | Oakes | May 25, 1926 |
| 1,819,743 | Duncan | Aug. 18, 1931 |